2 Sheets--Sheet 2.

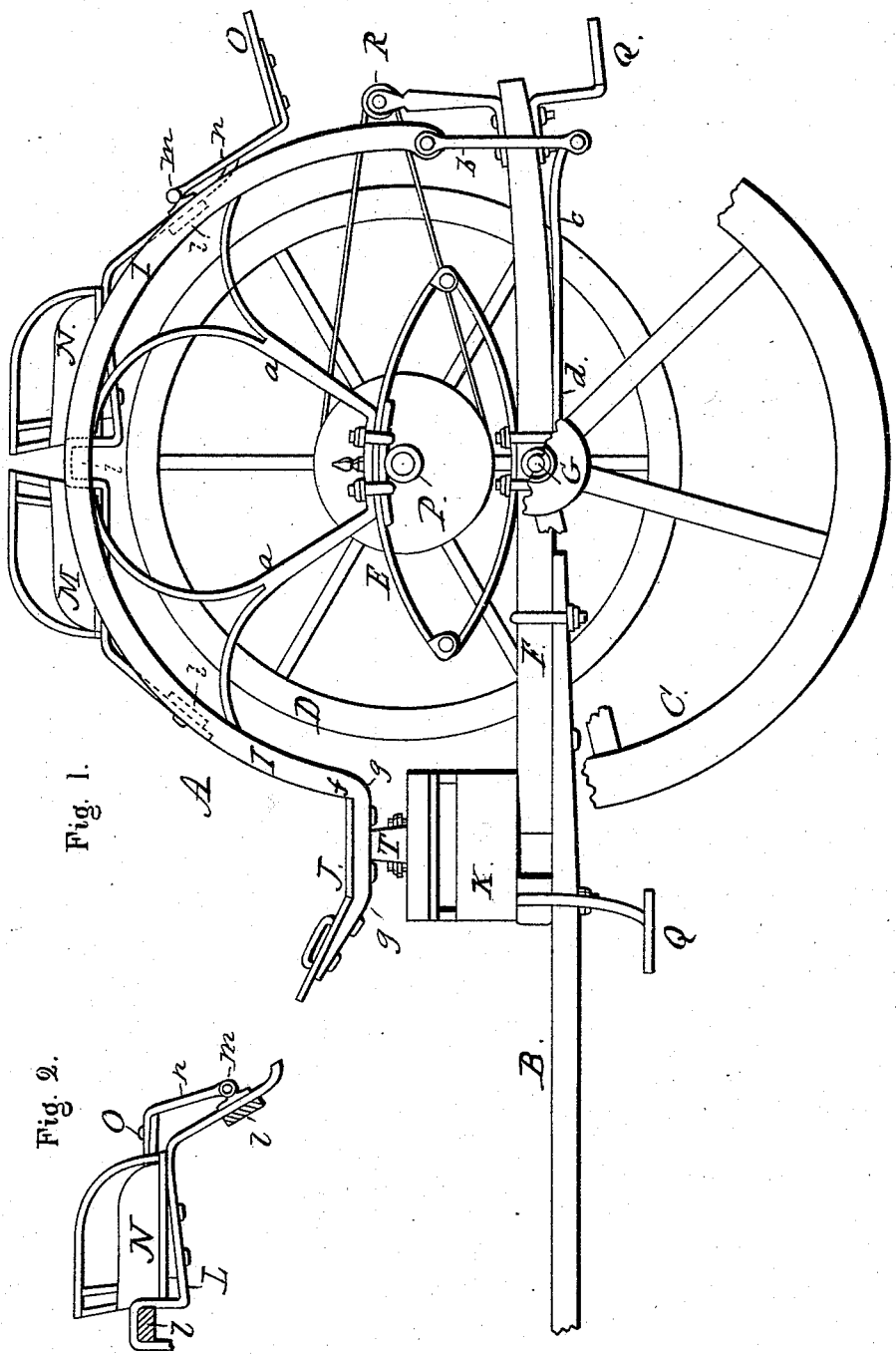

J. T. RYAN.
Hose-Carriages.

No. 153,849. Patented Aug. 4, 1874.

WITNESSES
Robert Morris Jr
Geo. H. Earl

INVENTOR
Joseph T. Ryan
Per Brun Brothers
Attorneys

UNITED STATES PATENT OFFICE.

JOSEPH T. RYAN, OF BOSTON, MASSACHUSETTS.

IMPROVEMENT IN HOSE-CARRIAGES.

Specification forming part of Letters Patent No. 153,849, dated August 4, 1874; application filed May 26, 1874.

*To all whom it may concern:*

Be it known that I, JOSEPH T. RYAN, of Boston, in the county of Suffolk and State of Massachusetts, have invented an Improvement in Hose-Carriages, of which the following is a specification:

This invention has for its object the arrangement and adjustment of the reel for the hose, &c., and seats for the hosemen, on a two-wheeled hose-carriage, in such a manner that the horse shall have no weight or strain upon him other than to support the shafts, and necessary exertion to draw the carriage.

As two-wheeled hose-carriages are at present constructed and used, it is impossible for the men to ride upon the same without the horse having more or less of the weight of the men to either sustain, or, if the men ride behind the reel, to resist the upward tendency of the shafts by reason of the extra weight behind.

To provide a carriage for all purposes of a hose-carriage, and allow of the men to ride without the extra weight or strain upon the horse beyond the pulling of the same, hose-carriages of four wheels have been constructed and used, but the objections to four-wheeled hose-carriages are, they are somewhat heavier, cost more, not so easy to manage, &c.

This invention consists of the securing of seats for the requisite number of men to bars, in the present instance, of semicircular or arch form, one each side of the hose-carriage, between the wheels, the bars being secured in a proper manner to elliptical springs, to which springs the reel is also secured, the lower ends of these bars being secured at the front, by a cross-bar, to a spring upon the box, generally on the shafts, and the rear ends to the free ends of flat springs under the frame of hose-carriage.

In the accompanying plate of drawings my invention is illustrated.

In Plate 1, Figure 1 is a side view of a two-wheeled hose-carriage with the wheel broken away, showing the arrangement of the seats and reel as secured to the elliptical springs, and directly over the axle-trees; Fig. 2, an end view of the rear seat, showing the manner of securing it to the bars, and with the foot-rest for same turned up out of the way.

Figure 3:
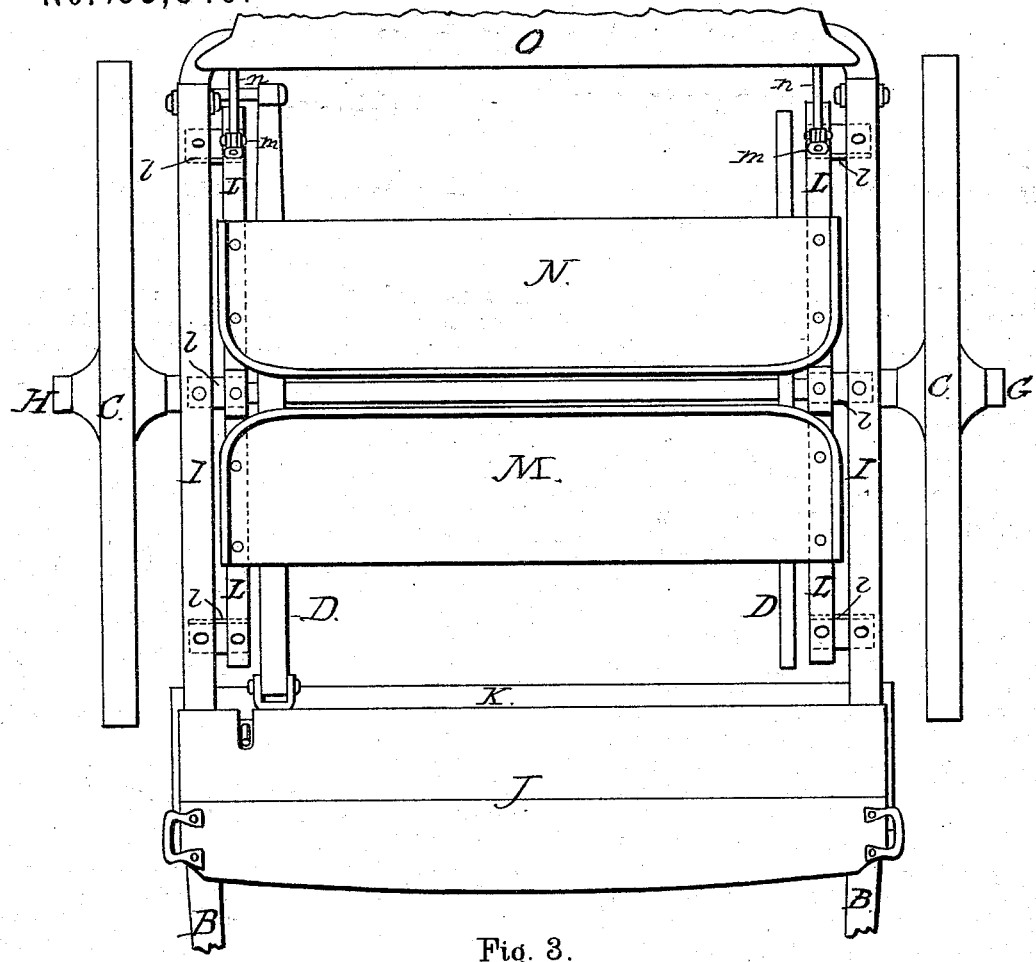
Figure 4:
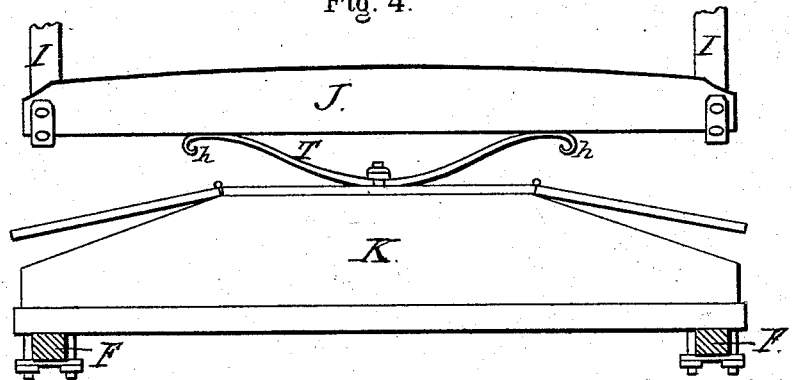

In Plate 2, Fig. 3 is a plan view; Fig. 4, a front view of box and front foot-rest, connecting the two front ends of bars together, and supported through a spring upon the box.

A in the drawings represents a hose-carriage having two wheels; B, the shafts; C, the wheels; D, the reel for the hose, as ordinarily; E, the elliptical springs, one on each side, and secured to the bars F, which are a prolongation of the shafts B, and are connected together behind to brace and strengthen them. Projecting outwardly from these bars F are the axle-trees G and H. I, bars of semicircular or arch form, their line generally concentric to the periphery of the reel, but of a diameter somewhat larger, and one on each side. The bars I are connected and firmly secured through braces $a\ a$ to the upper portion of the elliptical springs E, and by these lower rear ends by links $b$, straddling the bars F, to the free end of a flat spring, $c$, secured on the under side of the bars F at $d$. The other or front ends, $f$, of the bars I are connected together by a cross-bar or board, J, which serves also as a foot-rest, the front ends being bent, as shown at $g$, to give the proper shape to the foot-rest, as is usual in all carriages, &c. Under this foot-rest J is a double spring, T, bearing, by its two ends, $h$, on foot-rest, and by its middle secured to the box K, usually on all hose-carriages for the purpose of carrying wrenches, pipes, &c. Projecting inwardly, a short distance from these bars I, are arms $l$, to which are secured the strips L, bent as shown in Fig. 1, and following generally the line of the bars I. To and on these strips L the seats M and N, extending across the hose-carriage, are secured at their ends, by rivets or in any proper manner. At the lower ends of these strips, hinged at $m$, are the arms $n$, connected to the foot-rest O. The seat M faces the front, and has the foot-rest J, and the seat N the foot-rest O. The foot-rest O is hinged as above in order when the reel is in use, &c., it can be swung up and out of the way, as shown in Plate 1, Fig. 2. The reel is arranged to revolve in bearings P, rigidly secured to the under side of the upper part of each elliptical spring E. Q, steps to aid in getting on and off the carriage. R, an arrangement for revolving the reel. Strength and firmness are the result of the bars I being of semicircular form, added to their being secured in the middle and at their extreme ends to the frame and axle-tree, which also prevents any lateral movement; while the whole apparatus being secured to the springs, as hereinabove described, gives all the elasticity to the apparatus that is desired, and the benefits of which are obvious.

By the construction and arrangement of the parts as hereinabove described, all the advantages of hose-carriages having four wheels are secured, while all their disadvantages—as the extra cost, extra weight, more or less clumsy to operate, and requiring more room, &c.—are obviated.

The men sit back to back, three on each seat, resting their feet on the proper foot-rests.

The bars or supports I can be of any form desired, although it is preferable as herein described.

Having thus described my invention, what I claim, and desire to secure by Letters Patent, is—

1. In a two-wheeled hose-carriage, the semicircular supports for the seats, connected with elliptical springs supported by bars on the axle, and the hose-reel supported by said elliptical springs, all combined to operate as shown and described.

2. The bars F and axle-trees of a two-wheeled hose-carriage, with the semicircular supports I, seats $m$ and N, foot-rest J, box K, and reel D, all combined to operate substantially as shown and described.

The above specification of my invention signed by me this 27th day of March, A. D. 1874.

JOSEPH T. RYAN.

Witnesses:
EDWIN W. BROWN,
GEO. H. EARL.